(12) United States Patent
Kappertz et al.

(10) Patent No.: US 7,178,407 B2
(45) Date of Patent: Feb. 20, 2007

(54) MAGNETIC-INDUCTIVE FLOW SENSOR AND METHOD FOR ITS MANUFACTURE

(75) Inventors: Fred Kappertz, Hochwald (CH); Frank Voigt, Lörrach (DE); Daniel Wild, Birsfelden (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/003,499

(22) Filed: Dec. 6, 2004

(65) Prior Publication Data

US 2006/0096391 A1 May 11, 2006

Related U.S. Application Data

(60) Provisional application No. 60/544,240, filed on Feb. 13, 2004.

(30) Foreign Application Priority Data

Dec. 11, 2003 (DE) ................ 103 58 268
Feb. 9, 2004 (DE) ............. 10 2004 006 382

(51) Int. Cl.
*G01F 1/58* (2006.01)
(52) U.S. Cl. ................................. 73/861.11
(58) Field of Classification Search . 73/861.11–861.15
See application file for complete search history.

(56) References Cited

U.S. PATENT DOCUMENTS

| | | | | |
|---|---|---|---|---|
| 3,212,685 | A | * | 10/1965 | Richard et al. ............. 222/386 |
| 3,286,522 | A | | 11/1966 | Cushing ................... 73/861.11 |
| 3,981,190 | A | * | 9/1976 | Vidmantas ................ 73/861.12 |
| 4,253,340 | A | | 3/1981 | Schmoock ................ 73/861.12 |
| 4,641,537 | A | * | 2/1987 | Hansen et al. ............ 73/861.12 |
| 4,722,231 | A | * | 2/1988 | Tanaka et al. ............ 73/861.12 |
| 4,914,950 | A | | 4/1990 | Uematsu ................... 73/861.12 |
| 5,385,055 | A | * | 1/1995 | Kubota et al. ............ 73/861.12 |
| 5,458,003 | A | * | 10/1995 | Ishihara et al. ........... 73/861.12 |

(Continued)

FOREIGN PATENT DOCUMENTS

EP 0 402 460 B1 4/1993

(Continued)

*Primary Examiner*—Harshad Patel
(74) *Attorney, Agent, or Firm*—Bacon & Thomas, PLLC

(57) ABSTRACT

A flow sensor includes a measuring tube, made of essentially non-ferromagnetic material, for guiding the fluid, a magnetic circuit arrangement arranged on the measuring tube for producing and guiding a magnetic field, which induces in the flowing fluid an electric field, and measuring electrodes for sensing a voltage of the electric field. Additionally, the flow sensor includes an essentially rigid support frame for holding the measuring tube and for holding an electronics housing connected to the flow sensor, wherein measuring tube and support frame are mechanically coupled together on the inlet and outlet ends. For holding the measuring tube in the support frame, at least one connecting element is provided, which is attached to a first end of the measuring tube and to a first end of the support frame corresponding to such end of the measuring tube. The at least one connecting element is so formed and so arranged in the flow sensor, that it is essentially axially flexible, as compared to support frame and measuring tube, in the direction of the longitudinal axis of the measuring tube.

38 Claims, 3 Drawing Sheets

U.S. PATENT DOCUMENTS

| | | | |
|---|---|---|---|
| 5,526,698 A | 6/1996 | Sakurai | 73/861.12 |
| 5,664,315 A | 9/1997 | Unterseh | 29/602.1 |
| 6,595,069 B2 * | 7/2003 | Frey et al. | 73/861.11 |
| 6,658,720 B1 * | 12/2003 | Frey et al. | 29/593 |

FOREIGN PATENT DOCUMENTS

| | | |
|---|---|---|
| EP | 0 975 936 B1 | 2/2004 |
| WO | WO 96/08697 | 3/1996 |
| WO | WO 03/017741 A1 | 2/2003 |

* cited by examiner

MAGNETIC-INDUCTIVE FLOW SENSOR AND METHOD FOR ITS MANUFACTURE

This application claims the benefit of provisional application No. 60/544,240 filed Feb. 13, 2004.

FIELD OF THE INVENTION

The invention relates to a method for manufacturing a magnetically inductive flow sensor and to a flow sensor correspondingly manufacturable by means of the method.

BACKGROUND OF THE INVENTION

Flow measuring devices equipped with a magnetically inductive flow sensor are used to measure the volume flow rate of an electrically conductive fluid flowing in a flow direction through a measuring tube of the flow sensor. For this purpose, a magnetic field of maximized density is created at the flow sensor by means of a magnetic circuit arrangement electrically connected to an exciter electronics of the flow measuring device. The field passes through the fluid within the measuring volume at least in sections perpendicularly to the direction of flow and closes on itself essentially outside of the fluid. The measuring tube is usually made of a non-ferromagnetic material, in order that the magnetic field not be unfavorably influenced during measurement.

As a result of the movement of free charge carriers of the fluid in the magnetic field, an electric field is produced in the measuring volume, on the basis of the magneto-hydrodynamic principle. The electric field extends perpendicularly to the magnetic field and perpendicularly to the flow direction of the fluid. As a result, at least two measuring electrodes arranged spaced from one another in the direction of the electric field can be connected to an evaluation electronics of the flow measuring device to measure an electric voltage induced in the fluid. This voltage is a measure for the volume flow rate. The flow sensor is constructed such that the induced electric field closes on itself outside of the fluid practically exclusively by way of the evaluation electronics connected to the measuring electrodes. The induced voltage can be sensed, for example, by galvanic measuring electrodes contacting the fluid, or by non-contacting, capacitive measuring electrodes.

For guiding and coupling the magnetic field into the measuring volume, the magnetic circuit arrangement usually includes two coil cores, which are arranged along a perimeter of the measuring tube, preferably diametrally and as mirror images, spaced from one another and each with a free terminal face. A coil arrangement connected to the exciter electronics couples the magnetic field into the coil cores in such a way that it passes through the fluid flowing between the two terminal faces at least in sections perpendicularly to the flow direction.

Because of the great mechanical stability needed for such measuring tubes, they are preferably constructed of an outer, preferably metallic, support tube of predetermined strength and breadth, which is coated internally with an electrically non-conducting, insulating material of predetermined thickness, the so-called "liner". By way of example, each of the U.S. Pat. Nos. 6,595,069, 5,280,727, 4,679,442, 4,253,340 and 3,213,685, and the JP-Y 53-51 181 discloses a magnetically inductive flow sensor having a measuring tube insertable pressure-tightly into a pipeline. The measuring tube has a first, inlet end and a second, outlet end and includes a non-ferromagnetic support tube serving as an outer shell of the measuring tube and a tube-shaped liner seated in a lumen of the support tube. The liner constrains a flowing fluid and isolates it from the support tube.

The liner serves to chemically isolate the support tube from the fluid. In the case of support tubes of high electrical conductivity, especially in the case of metallic support tubes, the liner also serves an electrical insulation between the support tube and the fluid, in order to prevent a short circuiting of the electrical field through the support tube. Appropriate design of the support tube thus enables a matching of the strength of the measuring tube to the mechanical loads present in the respective application, while the liner enables the measuring tube to meet the chemical, especially hygienic, requirements of such application. Manufacture of the liner is often done by injection molding or transfer molding. It is, however, also common to insert a completely prefabricated liner into the support tube. In JP-A 59-137 822, a method is disclosed, in which the liner is formed by softening plastic film. Usually, open-pore, especially metallic, support bodies are embedded in the liner of, most often, thermoplastic or thermosetting plastic, to lend stability to the liner, this being shown, for example, in EP-A 36 513, EP-A 581 017, JP-Y 53-51 181, JP-A 59-137 822 and the U.S. Pat. Nos. 6,595,069, 5,664,315, 5,280,727 and 4,329,879. The support body serves to stabilize the liner mechanically, especially against pressure changes and thermally-related volume changes. By way of example, U.S. Pat. No. 5,664,315 discloses a method for manufacturing a measuring tube of a magnetically inductive flow sensor having an internal liner, in which method a pre-fabricated support body in the form of an expanded-metal screen for mechanically stabilizing the liner is placed in the support tube before the insertion of the liner. Additionally, JP-Y 53-51 181 shows a tube-shaped support body having holes in its lateral surfaces, while EP-A 581 017 and U.S. Pat. No. 6,595,069 disclose sintered support bodies. The support bodies are always installed in the lumen of the measuring tube and aligned therewith, as well as being completely enclosed by insulating material, at least on the inner side toward the fluid.

Especially the flow measuring device disclosed in U.S. Pat. No. 4,253,340 includes, additionally, a support frame for holding the measuring tube and for holding an electronics housing mechanically connected with the flow sensor. The housing serves to accommodate the above-mentioned exciter and evaluation electronics near the flow sensor and to protect such, to a wide degree, from environmental influences. Measuring tube and support frame are, in this connection, only attached to one another at the inlet and outlet ends, in each case over a relatively narrow connection area. Flow measuring devices along the lines of U.S. Pat. No. 4,253,340 excel in, among other things, permitting a very compact construction.

Investigations have now, however, shown that such flow measuring devices can have a tendency to form cracks in the area of the connection between the support tube and the support frame, especially in the area of weld connections, particularly in applications in the foods and pharmaceutical industries. It was additionally determined, that this behavior can especially be traced to high and rapidly changing axial stresses in the measuring tube because of rapid temperature changes over a very wide temperature range of about 150 K (Kelvin), such as can e.g. occur during cleaning and/or sterilization of the flow meter with hot fluids. Because of the relatively high stiffness of the measuring tube and support frame, these stresses tend to be relieved particularly in the area of the weld connections, which leads to the undesired cracks at these locations.

SUMMARY OF THE INVENTION

An object of the invention is to provide a magnetically inductive flow sensor having a support frame for measuring tube and electronics housing, in which sensor the tendency for crack formation in the area of the connection between measuring tube and support frame can be significantly decreased.

For attaining the object, the invention resides in a magnetically inductive flow sensor for a fluid flowing in a pipeline, including a measuring tube, made of essentially non-ferromagnetic material, for guiding the fluid, a magnetic circuit arrangement arranged on the measuring tube for producing and conducting a magnetic field, which induces in the flowing fluid an electric field, and measuring electrodes for measuring a voltage of the electric field. Additionally, the flow sensor includes an essentially rigid support frame for holding the measuring tube and for holding an electronics housing connected to the flow sensor, wherein measuring tube and support frame are mechanically coupled together at the inlet and outlet ends. For holding the measuring tube in the support frame, at least one first connecting element is provided, which is attached to a first end of the measuring tube and to a first end of the support frame corresponding to such end of the measuring tube, wherein the at least one connecting element is so formed and so arranged in the flow sensor, that it is essentially axially flexible, as compared to support frame and measuring tube, in the direction of the longitudinal axis of the measuring tube.

BRIEF DESCRIPTION OF THE DRAWINGS

The invention and advantageous embodiments thereof will now be explained in greater detail on the basis of the figures of the drawing. Equal parts are given equal reference characters. However, in cases where clarity is promoted thereby, reference characters in subsequent figures are omitted.

DESCRIPTION OF THE PREFERRED EMBODIMENTS

Figure 1:
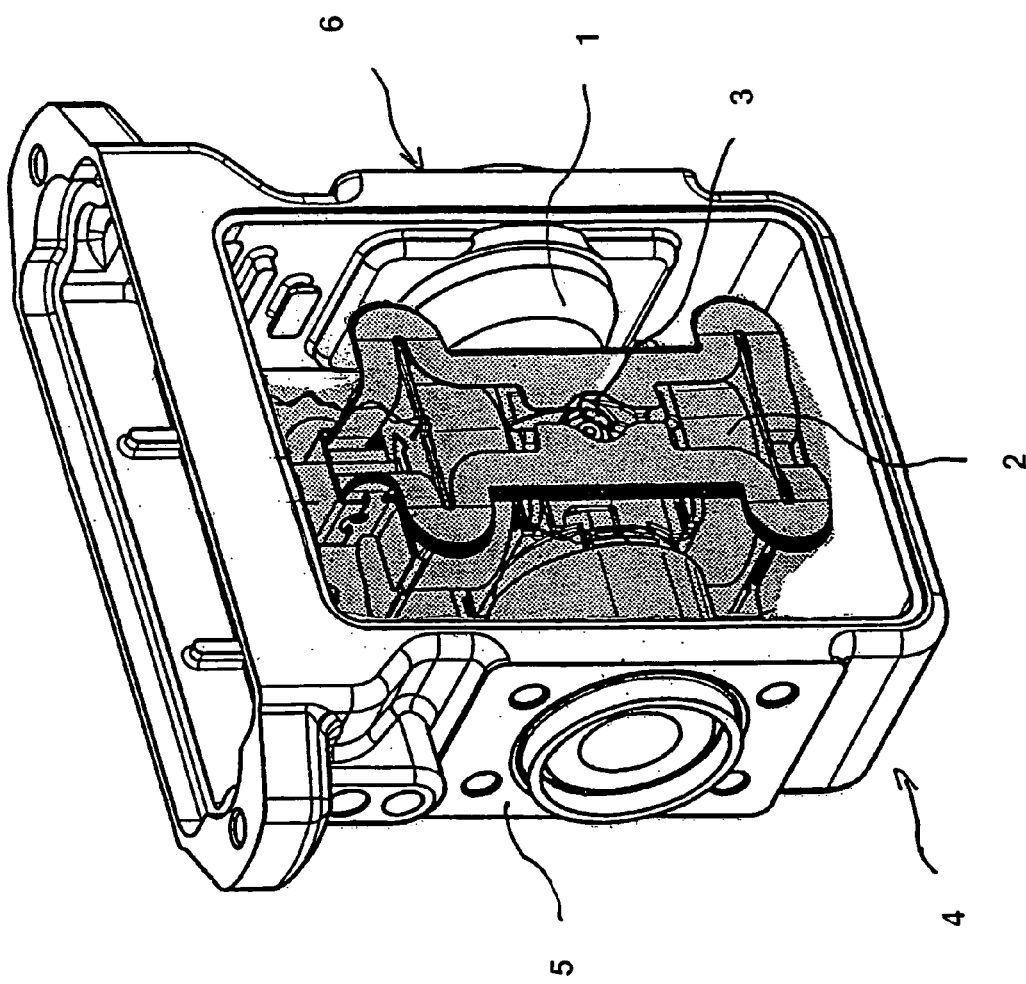
FIG. 1 shows a perspective side view of a magnetically inductive flow sensor having a support frame and a measuring tube mounted therein.

According to a first development of the flow sensor of the invention, the at least one connecting element is constructed radially essentially stiffer than axially.

According to a second development of the flow sensor of the invention, the at least one connecting element and the support frame are constructed as one piece.

According to a third development of the flow sensor of the invention, the at least one connecting element is constructed as a lateral border of a groove, which preferably extends coaxially with the measuring tube and is formed in the support frame.

According to a fourth development of the flow sensor of the invention, the support frame is comprised of metal, preferably stainless steel.

According to a fifth development of the flow sensor of the invention, the connecting element and the support frame are comprised of metal, preferably stainless steel, and the at least one connecting element is welded or soldered to the support frame.

According to a sixth development of the flow sensor of the invention, the at least one connecting element is a membrane, or diaphragm, preferably an annular membrane arranged coaxially with the measuring tube.

According to a seventh development of the flow sensor of the invention, the measuring tube is held further in the support frame by at least one, preferably essentially identical to the first connecting element, second connecting element, which is attached to a second end of the measuring tube and to a second end of the support frame corresponding to such end of the measuring tube, wherein, also, the second connecting element is constructed and arranged in the flow sensor such that it is, in comparison to the support frame and the measuring tube, axially flexible in the direction of the longitudinal axis of the measuring tube.

According to a further development of the flow sensor of the invention, the measuring tube includes a preferably metallic support tube and a liner arranged in a lumen of the support tube, the liner comprised of insulating material, such as e.g. one of the thermoplastics or thermosetting plastics, and being preferably tube shaped.

According to a first embodiment of the further development of the flow sensor of the invention, the at least one connecting element is a lateral border of a groove formed in the support tube.

According to a second embodiment of the further development of the flow sensor of the invention, the connecting element and the support tube are formed as one piece.

According to a third embodiment of the further development of the flow sensor of the invention, the support tube is comprised of metal, preferably stainless steel.

According to a fourth embodiment of the further development of the flow sensor of the invention, the support tube and the connecting element are comprised of metal, preferably stainless steel, and the at least one connecting element is welded or soldered to the support tube.

A fundamental idea of the invention is that use of relatively flexible connecting elements for securing the measuring tube in the support frame permits slight relative movements between measuring tube and support frame and, consequently, transforms possibly arising axial stresses and strains in the flow sensor into elastic deformations mainly of the connecting element.

Figure 2:
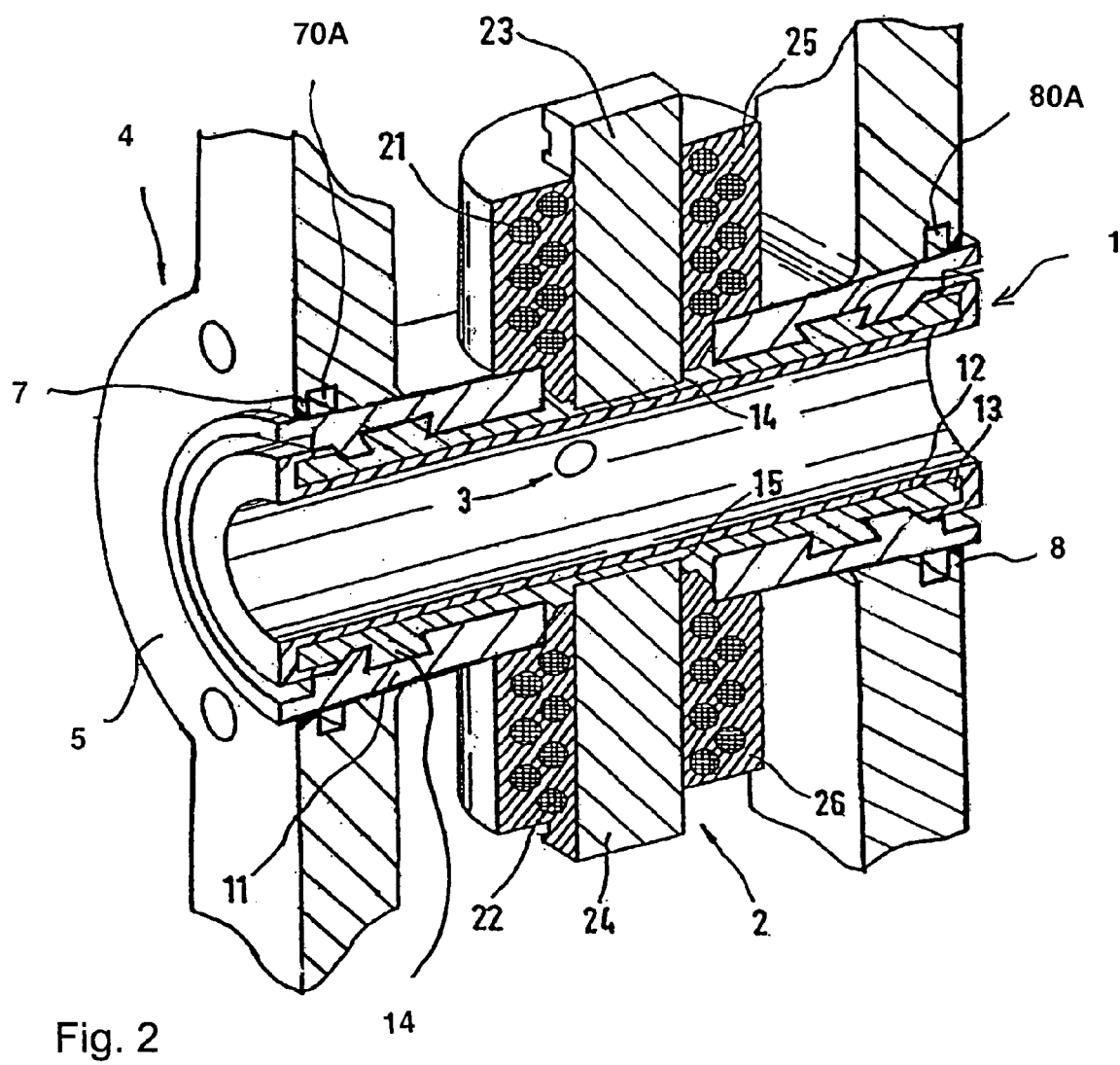
FIG. 2 shows a perspective longitudinal section of a magnetically inductive flow sensor as in FIG. 1.
Figure 3:
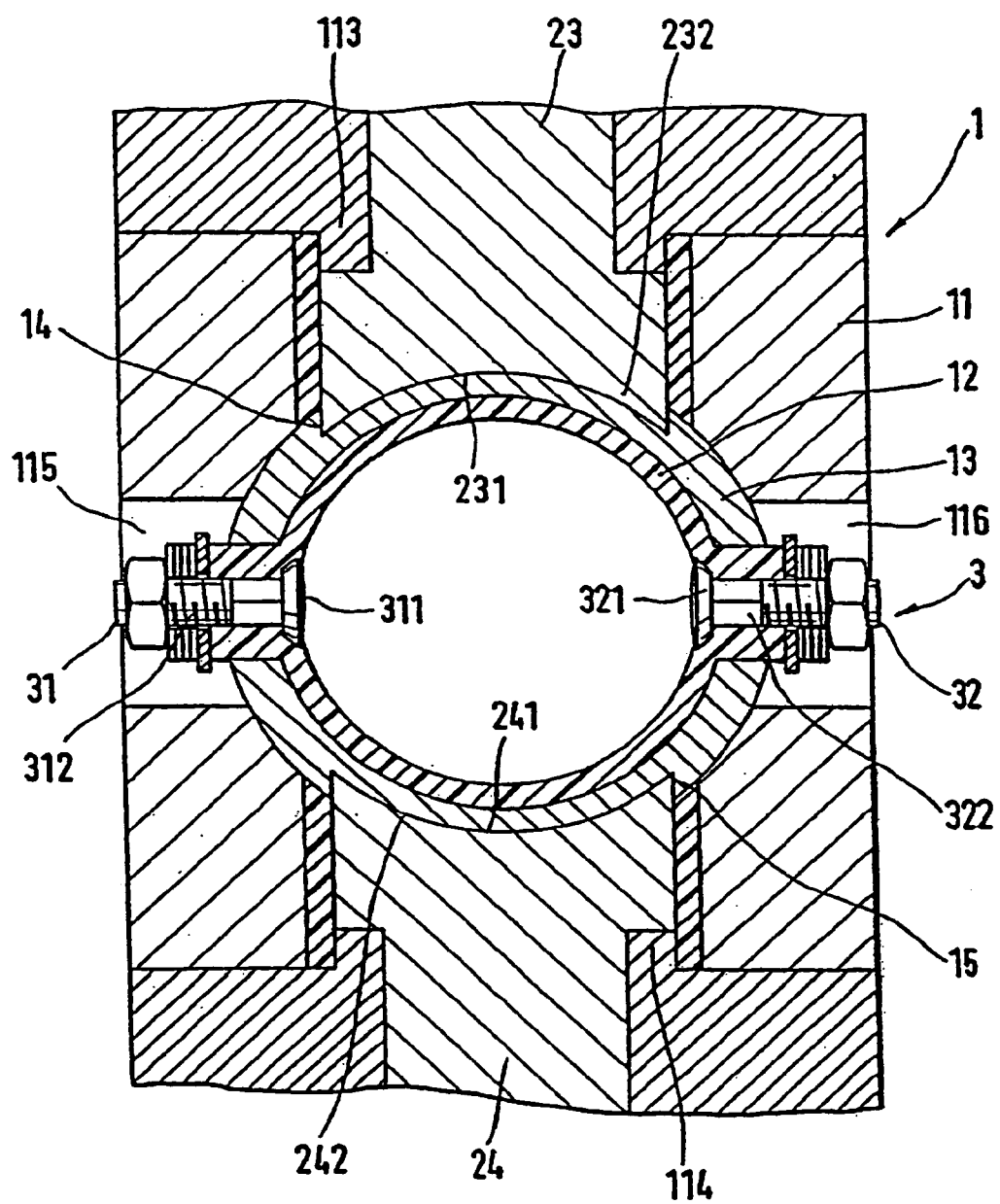
FIG. 3 shows in cross section a portion of the magnetically inductive flow sensor of FIG. 2.

FIG. 1 shows a perspective side view of a magnetically inductive flow sensor, while FIGS. 2 and 3 are schematic illustrations of examples of embodiments of such a flow sensor, in, respectively, longitudinal, and cross, section. The flow sensor includes a straight measuring tube 1 of predeterminable shape and size for guiding a flowing fluid, a magnetic circuit arrangement 2 arranged at the measuring tube 1 for directing a magnetic field such that it passes through the fluid, and a measuring electrodes arrangement 3 likewise arranged at the measuring tube 1 for measuring a voltage induced in the fluid. Additionally, the flow sensor includes an essentially rigid support frame 4 for holding an electronics housing (not shown here) electrically and mechanically connected with the flow sensor, with the measuring tube 1 and the support frame 4 being mechanically coupled together at the inlet and outlet ends. For pressure-tight insertion into a pipeline that can contain a fluid, the measuring tube 1 has at a first measuring tube end a first flange 5 and at a second measuring tube end a second flange 6. Both flanges 5, 6 are integrated into the support frame 4 in the embodiment illustrated here, preferably by being formed in the support frame itself. Advantageously relative to this feature, the support frame 4 and flanges 5, 6 are thus constructed as one piece.

In the embodiment illustrated in FIGS. 2 and 3, the measuring tube 1 includes a preferably metallic support tube 11 of predeterminable lumen and a tube-shaped liner 12 of an insulating material and also of predeterminable breadth, as well as, embedded in the liner 12, an open-pored support body 13 of predeterminable pore-size and thickness. The support body 13, which is likewise tube-shaped, serves for mechanically stabilizing the liner 12, especially in the case where, during operation, the fluid flowing in the measuring tube exhibits temperatures in the range −40° C. to 200° in a pressure range from 0 bar to 40 bar. The support tube 11 is made of a non-ferromagnetic material, such as e.g. stainless steel, or some other rust-free metal, coaxially surrounds the liner 12 with its embedded support body 13, and serves thus as an outer, form-giving, as well as form stabilizing, encasement of the measuring tube 1. In FIGS. 2 and 3, the measuring tube 1 is embodied such that the support body 13 is completely covered, on its inner side facing the traversing fluid, by the liner 12, so that only the liner 12 is contacted by the fluid flowing through the measuring tube 1; see, in this connection, U.S. Pat. No. 3,213,685. Optionally, the support tube 11 itself can be contacted, and even completely lined, internally by the material of the liner, for example a thermoplastic or thermosetting plastic material.

For producing and guiding a magnetic field passing through the fluid flowing in the measuring tube during operation, the flow sensor is provided with a magnetic circuit arrangement 2. This includes first and second, cylindrical coils 21, 22, each surrounding, respectively, a first and second ferromagnetic coil core 23, 24, each core having, respectively, a free, terminal, first and second face 231, 241 of predeterminable form. For suppressing eddy currents, the coil cores are preferably provided as a single sheet-metal formed part or as a packet of a plurality of layered sheet-metal formed parts electrically insulated from one another; see JP-Y 2-28 406 or U.S. Pat. No. 4,641,537. Outside of the measuring tube 1, the coil cores 23, 24 are connected at their ends opposite to their respective end faces 231, 241, to a flux return path, likewise of ferromagnetic material, of predetermined length and form; see FIG. 1. Usually the return path extends externally on both sides around the measuring tube 1; see, in this connection, U.S. Pat. No. 4,641,537. The coils 21, 22 are wound, respectively, on tubular coil bodies 25, 26 coaxially surrounding the respective first and second coil cores 23, 24; the coils 21, 22 can, however, also be self-supporting or even, at least partially, embedded in the coil bodies 25, 26. Besides magnetic circuit arrangements of two coils, it is also completely common to use ones with three or more coils; see, in this connection, JP-A 3-218 414. During measurements, the coils 21, 22 are connected with an exciter electronics for producing electrical currents of predeterminable current strength, and these flow through the coils. This creates two magnetic field portions, which pass through the respective end faces 231, 241 of the associated coil cores 23, 24 essentially at right-angles to these faces and, in the process, become superimposed vectorially into a resulting magnetic field. This passes through the fluid flowing within a measurement volume sectionally perpendicular to its direction of flow. The exciter electronics can be circuit arrangements known to those skilled in the art or described in the state of the art.

For receiving the coil cores 23, 24, the measuring tube 1 includes, as show schematically in FIGS. 2 and 3, a first coil core seat 14 for accepting the end of the coil core 23 and a second coil core seat 15 for accepting the end of the coil core 24; compare FIGS. 1 and 2. The coil core seats 14, 15 exhibit respective first and second surfaces 232, 242 matched in form to the respective end faces 231, 241 of the coil cores 23, 24, and the end faces 231, 241 lie in contact against these surfaces 232, 242. For inserting the coil cores 23, 24 into the coil core seats 14, 15, the support tube 11 is provided with a lateral first window 113 and a lateral second window 114. Both windows 113, 114 have the same shape and are arranged on the periphery of the support tube 11 spaced from one another, particularly such that they are located diametrically opposite to one another. The coil cores 23, 24 extend through their respective windows 113 and 114 in the measuring tube 1 and are so oriented with respect to one another that their two end faces 231, 241 are separated from one another, especially diametrally separated, and lie in mirrored relationship opposite to one another. The windows 113, 114, respectively the end faces 231, 241, can, however, also be spaced from one another along a chord of the periphery of the measuring tube and/or be arranged in a non-mirrored relationship on the measuring tube; see JP-A 3-218 414. Naturally, for the insertion of the coil cores 23, 24, the windows 113, 114 are to be dimensioned such that the coil cores 24, 24 pass through them without any further measures having to be taken.

For sensing a voltage induced in the flowing fluid, the flow sensor uses a sensing arrangement 3 applied to the measuring tube 1. The sensing arrangement includes first and second measuring electrodes 31, 32. The electrodes are rod-shaped and have first and second measuring electrode heads 311, 321 for sensing the above-mentioned, induced voltage and first and second measuring electrode shanks 312, 322 for connecting the sensor arrangement to an evaluation electronics. The measuring electrodes 31, 32 can, as shown in FIG. 3, be galvanic measuring electrodes, but they can also be capacitive. The support tube 11 is also provided with lateral third and fourth windows 115, 116 for the insertion of the measuring electrodes 31 and 32, respectively. Each of the windows 115 and 116 has a breadth that is greater than the largest diameter of the shank 312, 322 it is to accept.

Preferably, they have the same shape and are preferably situated diametrically opposite to one another, with a diameter of the support tube joining the windows 115, 116 extending perpendicularly to a diameter joining the windows 113, 114. Naturally, the measuring electrodes 31, 32, if required, especially for cases of more than two electrodes, can be arranged on the measuring tube 1 so spaced from one another that they are not diametrally opposite. This is e.g. the case, when additional measuring electrodes are provided for reference potentials or where, in the case of horizontal installation of the measuring tube 1, measuring electrodes are provided for checking for a minimum fill level of the fluid in the measuring tube 1.

As already mentioned, the inlet and outlet ends of the measuring tube 1 are mechanically fixed to the support frame 4. The material for the support frame can be, for practical purposes, the same as that used for the possibly present support tube 11, for example stainless steel or other high quality steel alloys.

For the axially elastic holding of the measuring tube 1 in the support frame 4, or vice versa, a first connecting element 7 is provided, which is secured at the first end of the measuring tube and at a first end of the support frame 4 corresponding to this end of the measuring tube. The connecting element 7 is so constructed and so arranged in the flow sensor that it is, relative to the support frame 4 and the measuring tube 1, essentially axially flexible in the direction of the longitudinal axis of the measuring tube. This enables relative movement between measuring tube and support frame, at least in the direction of the longitudinal axis of the measuring tube and at least within the elastic range of the connecting element, without producing unacceptably high mechanical stresses and/or material strains in the area of the seams between support frame 4 and connecting element 7 or between connecting element 7 and measuring tube 1. For this purpose, an advantageous embodiment of the invention provides the at least one connecting element as a membrane, or diaphragm, especially an annular membrane arranged coaxially with the measuring tube. The annular membrane is secured at an inner edge to the measuring tube and at an outer edge to the support frame. As indicated schematically in FIG. 2, the at least one connecting element 7 and the support frame 4 can be a single piece; in this connection, alternatively or additionally, it is also possible to make the at least one connecting element 7 and the measuring tube 1, especially the possibly present support tube 11, one piece.

For avoiding too much play in the direction radial to the longitudinal axis of the measuring tube, one embodiment of the invention provides that the at least one connecting element is radially essentially stiffer than in the axial direction.

In a further development of the invention, the measuring tube 1 is additionally held in the support frame 4 by a second connecting element 8 essentially identical to the first connecting element 7. Element 8 is secured to a second end of the measuring tube and to a second end of the support frame corresponding to this end of the measuring tube. Also the connecting element 8 is so constructed and so arranged in the flow sensor that it is, relative to the support frame 4 and the measuring tube 1, axially flexible in the direction of the longitudinal axis of the measuring tube.

In one advantageous embodiment of the invention, the connecting elements 7, 8 and the support frame are each made of metal, for instance stainless steel, wherein preferably such metals are chosen as the material for the support frame and support tube that exhibit essentially equal coefficients of thermal expansion. Furthermore, each of the connecting elements 7, 8 are secured to the support frame 4 by weld or solder connections; in this regard, alternatively or additionally, it is also possible to secure each of the connecting elements to the measuring tube 1, especially to the possibly present support tube 11 by means of weld or solder connections.

Figure 4:
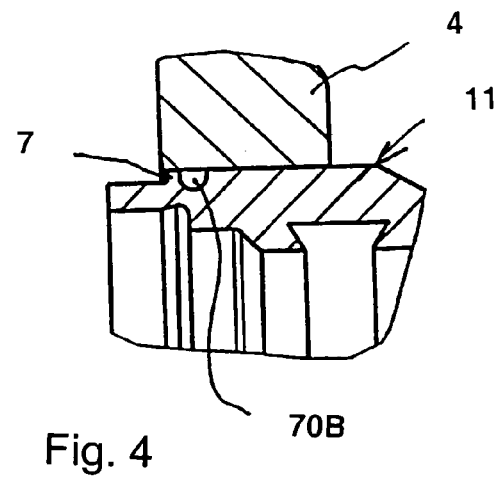
FIG. 4 shows a schematic longitudinal section of an example of an embodiment of a connecting element serving for securing the measuring tube of Fig. in the support frame.

In a further advantageous embodiment of the invention, the at least one connecting element is constructed, as shown schematically in FIG. 2, as a lateral border of a groove 70A, especially a groove running coaxially to the measuring tube 1, especially an annular groove, which is formed in the support frame; in this connection, alternatively or additionally, it is also possible to construct the at least one connecting element as a lateral border of a groove 70B, especially an annular groove, which is formed into the outside of the measuring tube 1, especially into the possibly present support tube 11, reference being made to FIG. 4 in this regard. Analogously, also the connecting element 8 can, for example, be constructed as a lateral border of a groove 80A, which, as shown schematically in FIG. 2, is formed into the second end of the support frame 4 and/or, in corresponding manner, into the outside of the measuring tube 1.

The use of grooves 70A, 70B, 80A, especially the use of annular grooves, provides, on the one hand, the advantage that each connecting element 7, 8 and the mechanical connection to be formed between such and the support frame 4 or the measuring tube 1 can be manufactured very simply and advantageously with respect to cost, for example by milling or turning. On the other hand, it means that the grooves themselves, as well as the associated lateral borders serving as the connecting elements 7, 8, can be optimized in their dimensions in each case very simply with respect to the axial flexibility required, and radial stiffness suited, for the particular area of use in which the flow sensor will be applied. Moreover, an additional advantage here is that the air volume enclosed by the groove forms a very effective heat insulator, which, for example, blocks, or at least significantly reduces, extended penetration of heat energy from the seam into the measuring tube 1 and/or the support frame 4 during welding or soldering of the connecting element 7, 8 to the support frame 4, or the measuring tube 1, as the case may be. Correspondingly, the heating energy level introduced into the location of the seam during welding or soldering can be relatively high, which means that a high depth of penetration can be achieved.

The invention claimed is:

1. A magnetically inductive flow sensor for a fluid flowing in a pipeline, said sensor comprising:
   an measuring tube for guiding the fluid;
   a magnetic circuit arrangement arranged on said measuring tube for producing and guiding a magnetic field, which induces an electric field in the flowing fluid;
   measuring electrodes for measuring a voltage induced in the flowing fluid;
   an essentially rigid support frame for holding said measuring tube; and
   at least one connecting element attached to one end of said measuring tube and to one end of said support frame for mechanically coupling said support frame with said measuring tube; wherein:
   said at least one connecting element is so formed and so arranged in the flow sensor, that said at least one connecting element is essentially axially flexible, as compared to said support frame and said measuring tube, in the direction of a longitudinal axis of said measuring tube.

2. The magnetically inductive flow sensor as claimed in claim 1, wherein: said at least one connecting element is constructed to be essentially stiffer radially than axially.

3. The magnetically inductive flow sensor as claimed in claim 1, wherein: said at least one connecting element and said support frame are constructed as one piece.

4. The magnetically inductive flow sensor as claimed in claim 1, wherein: said at least one connecting element is constructed as a lateral border of a groove.

5. The magnetically inductive flow sensor as claimed in claim 1, wherein: said support frame is comprised of metal.

6. The magnetically inductive flow sensor as claimed in claim 5, wherein: said support frame is comprised of stainless steel.

7. The magnetically inductive flow sensor as claimed in claim 1, wherein: said connecting element and said support frame are comprised of metal.

8. The magnetically inductive flow sensor as claimed in claim 7, wherein: said at least one connecting element is welded to said support frame.

9. The magnetically inductive flow sensor as claimed in claim 7, wherein: said at least one connecting element is soldered to said support frame.

10. The magnetically inductive flow sensor as claimed in claim 7, wherein: said support frame and said connecting element are comprised of stainless steel.

11. The magnetically inductive flow sensor as claimed in claim 1, wherein: said at least one connecting element is a membrane.

12. The magnetically inductive sensor as claimed in claim 11, wherein: said at least one connecting element is an annular membrane.

13. The magnetically inductive sensor as claimed in claim 12, wherein said at least one connecting element is arranged coaxially with said measuring tube.

14. The magnetically inductive flow sensor as claimed in claim 1, wherein: said at least one connecting element is constructed as a lateral border of a groove formed in said measuring tube, especially an annular groove.

15. The magnetically inductive sensor as claimed in claim 1, wherein; said measuring tube comprises a support tube and a liner arranged in a lumen of said support tube, said liner being of insulating material.

16. The magnetically inductive flow sensor as claimed in claim 15, wherein: said connecting element and said support tube are constructed as one piece.

17. The magnetically inductive flow sensor as claimed in claim 15, wherein: said support tube and said connecting element are comprised of metal.

18. The magnetically inductive flow sensor as claimed in claim 17, wherein: said at least one connecting element is welded to said support tube.

19. The magnetically inductive flow sensor as claimed in claim 17, wherein: said at least one connecting element is soldered to said support tube.

20. The magnetically inductive flow sensor as claimed in claim 17, wherein: said support tube and said connecting element are comprised of stainless steel.

21. The magnetically inductive sensor as claimed in claim 15, wherein said measuring tube comprises a metallic support tube.

22. The magnetically inductive flow sensor as claimed in claim 21, wherein: said connecting element and said support tube are constructed as one piece.

23. The magnetically inductive sensor as claimed in claim 15, wherein the liner is of thermoplastic material.

24. The magnetically inductive sensor as claimed in claim 15, wherein the liner is of thermosetting plastics.

25. The magnetically inductive sensor as claimed in claim 15, wherein the liner is tube shaped.

26. The magnetically inductive flow sensor as claimed in claim 1, wherein: said measuring tube is held in said support frame by at least two connecting elements, each of said two connectina elements being constructed and arranged in the flow sensor such that said connecting element is, in comparison to said support frame and said measuring tube, axially flexible in the direction of the longitudinal axis of said measuring tube.

27. The magnetically inductive flow sensor as claimed in claim 26, wherein: a first one of said at least two connecting elements is attached to a first end of said measuring tube and to a first end of said support frame corresponding to the first end of said measuring tube, and a second one of said at least two connecting elements is attached to a second end of said measuring tube and to a second end of said support frame corresponding to the second end of said measuring tube.

28. The magnetically inductive flow sensor as claimed in claim 1, wherein: said at least one connecting element is constructed as a lateral border of a groove coaxial with said measuring tube.

29. The magnetically inductive flow sensor as claimed in claim 1, wherein: said at least one connecting element is constructed as a lateral border of a groove formed in said support frame.

30. The magnetically inductive flow sensor as claimed in claim 1, wherein: said at least one connecting element is constructed as a lateral border of an annular groove formed in said support frame.

31. The magnetically inductive flow sensor as claimed in claim 1, wherein: said at least one connecting element is constructed as a lateral border of a groove formed into outside of said measuring tube.

32. The magnetically inductive flow sensor as claimed in claim 1, wherein: said at least one connecting element is constructed as a lateral border of an annular groove formed into outside of said measuring tube.

33. The magnetically inductive flow sensor as claimed in claim 1, further comprising a first flange at a first end of said measuring tube and a second flange at a second end of said measuring tube.

34. The magnetically inductive flow sensor as claimed in claim 33, wherein both flanges are integrated into the support frame.

35. The magnetically inductive flow sensor as claimed in claim 34, wherein both flanges are formed in the support frame itself.

36. The magnetically inductive flow sensor as claimed in claim 35, wherein both flanges are support frame and flanges are constructed as one piece.

37. The magnetically inductive flow sensor as claimed in claim 1, wherein the measuring tube is essentially non-ferromagnetic.

38. The magnetically inductive flow sensor as claimed in claim 1, wherein the support frame is further adapted to hold an electronics housing electrically connected with said flow sensor.

* * * * *